United States Patent
Otterbach et al.

(10) Patent No.: US 7,236,902 B2
(45) Date of Patent: Jun. 26, 2007

(54) DEVICE FOR IMPACT SENSING

(75) Inventors: Jens Otterbach, Wenden (DE); Pascal Kocher, Gerlingen (DE); Gerald Nitsche, Balingen (DE); Jochen Schomacker, Reutlingen (DE); Michael Ulmer, Moessingen (DE); Rolf-Juergen Recknagel, Jena (DE); Boris Adam, Gaeufelden (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/524,676

(22) PCT Filed: Feb. 24, 2003

(86) PCT No.: PCT/DE03/00561

§ 371 (c)(1),
(2), (4) Date: Oct. 13, 2005

(87) PCT Pub. No.: WO2004/020252

PCT Pub. Date: Mar. 11, 2004

(65) Prior Publication Data

US 2006/0111862 A1 May 25, 2006

(30) Foreign Application Priority Data

Aug. 14, 2002 (DE) ................. 102 37 162

(51) Int. Cl.
*G01L 27/00* (2006.01)

(52) U.S. Cl. .................................................. 702/98
(58) Field of Classification Search ............... 702/98, 702/47, 50, 138; 73/157; 700/301
See application file for complete search history.

(56) References Cited

FOREIGN PATENT DOCUMENTS

| DE | 198 30 835 | | 1/2000 |
|---|---|---|---|
| DE | 198 50 851 | * | 4/2000 |
| DE | 102 101 31 | | 9/2003 |
| EP | 196 47 408 | | 11/1997 |
| EP | 111 47 57 | | 7/2001 |
| JP | 11-326084 | * | 11/1999 |

OTHER PUBLICATIONS

Marcelo Godoy Simoes, A novel competitivelearning neural network based acoustic transmission system for oil-well monitoring, IEEE vol. 36, No. 2, Mar. 2000, p. 484-491.*
http://www.m-w.com/dictionary/normalize, p. 1.*

* cited by examiner

*Primary Examiner*—Bryan Bui
*Assistant Examiner*—Tung S Lau
(74) *Attorney, Agent, or Firm*—Kenyon & Kenyon LLP

(57) ABSTRACT

A device for impact sensing is described which detects an impact by a pressure, a normalized signal being supplied to a processor for analyzing the pressure signal. This normalization may occur either in the pressure sensor, by the sensor element itself or by a signal preprocessor, or in the processor.

8 Claims, 1 Drawing Sheet

DEVICE FOR IMPACT SENSING

FIELD OF THE INVENTION

The present invention relates to a device for impact sensing.

BACKGROUND INFORMATION

German Patent Application No. 102 10 131.0 (not a prior publication) refers to a communication of pressure data from a pressure sensor to a control unit as differential values or absolute values.

SUMMARY OF THE INVENTION

The present invention may provide an exemplary device for impact sensing, which communicates normalized pressure values to ensure that the pressure signal is independent of the ambient pressure, and may make simple and inexpensive performance of the signal analysis in the central control unit. Furthermore, by shifting of the signal processing, better performance in the control unit may be expected. Also, normalization of the pressure data may provide a prerequisite for enabling the normalized pressure data to be compatible with the signals from acceleration sensors.

An exemplary embodiment and/or exemplary method of the present invention may provide an improved the device for impact sensing in a vehicle.

According to an exemplary embodiment and/or exemplary method of the present invention, the signal may be normalized to the ambient pressure, which may be detected by an additional sensor or it may already be stored in a memory, or the sensor element, i.e., in particular a micromechanical sensor element, may be configured so that it already outputs a normalized ambient pressure as the measured value. If an another sensor is provided in addition to the pressure sensor for impact sensing, then this additional sensor may be used to register the ambient pressure outside of a largely enclosed element in which the pressure sensor for impact sensing is located. The pressure sensor for impact sensing may work according to the principle of registering an adiabatic pressure increase that occurs because of a deformation of a vehicle part.

DETAILED DESCRIPTION

Pressure sensors may be used in industry and automotive applications. Depending on the configuration, these may transmit absolute or differential pressure values. In the case of the automobile, along with engine control, the pressure sensors may also be used for sensing side impacts.

According to an exemplary embodiment and/or exemplary method of the present invention, the pressure signal may be normalized so as to simplify further processing. Consequently, the pressure signal for the airbag triggering procedure may be independent of the ambient pressure and the signal processing in the central control unit may be kept simple and inexpensive. If this preprocessing is shifted to the relocated pressure sensors due to the normalization, better performance in the central control unit may be expected. In particular, normalization may also ensure the compatibility of the signals from the pressure and acceleration sensors.

Pressure sensors may be used in modern restraint systems for measuring the deformation of the side doors in the event of a side impact. This may be accomplished via an adiabatic pressure increase, which may provide quick sensing of a side impact. Triggering times of a few milliseconds may also be provided here. For the pressure sensor, the useful signal in the case of an impact is in a first approximation proportional to the ambient pressure, i.e., as a function of the altitude at which the vehicle is being operated, as well as of the current weather situation. In order for these influence variables not to be taken into account in the triggering procedure, the pressure signals are reprocessed appropriately. This may be carried out either in the sensor itself or in the control unit. In certain cases, by configuring the sensor element appropriately it may even be possible to map the signal processing, which in some circumstances may be a cost-effective approach. The goal is to transmit a value such as:

$$P_{N1} = S \cdot \frac{(P - P_0)}{P_0}$$

or $$P_{N2} = S \cdot \frac{P}{P_0}$$

where S is the scaling factor, P is the currently measured absolute pressure in the interior of the door and $P_0$ is the absolute ambient pressure. A feature of the procedure or the control unit, in addition to the non-dependency of the crash signal on the ambient pressure, is that the measure illustrated may make it possible for the pressure to be compatible with acceleration sensors that were formerly used exclusively.

Figure 1:
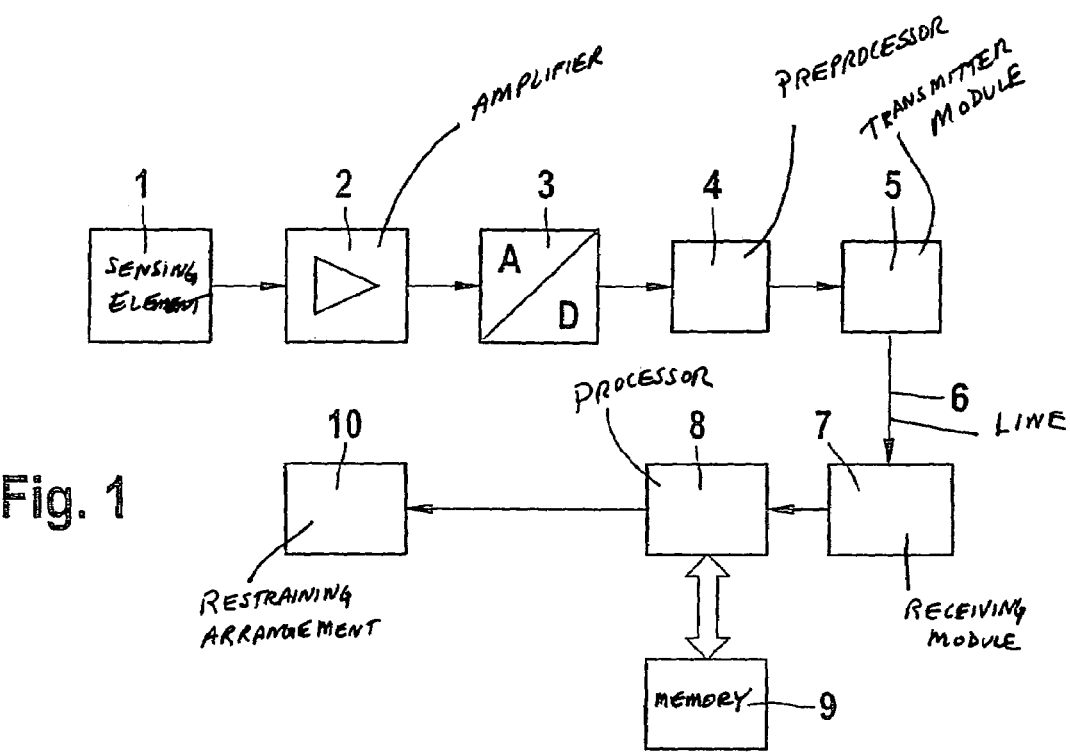
FIG. 1 shows a block diagram of an exemplary device according to the present invention.

FIG. 1 shows a block diagram of an exemplary device according to the present invention. A sensing element or sensor element 1, for example a micromechanical diaphragm, acts here as a pressure-measuring element. The signal which is emitted by sensor element 1 is amplified by an amplifier 2, and is then passed to an analog-digital converter 3 to be digitized. The digitized signal is then passed to a signal preprocessor 4, which then passes the preprocessed signal to a transmitter module 5. Transmitter module 5 transmits the filtered signal via a line 6 to a control unit, namely to a receiving module 7. Receiving module 7 then passes the received signal to a processor 8, which employs a memory 9 to use the pressure signal via a data input/output for a triggering procedure for restraining devices. As a function of the analysis of this triggering procedure, a restraining arrangement 10, for example an airbag or belt tensioner, is then activated. Hence the pressure sensor is made up of sensor element 1, amplifier 2, analog-digital converter 3, signal preprocessor 4 and transmitter module 5. These elements are housed in an enclosure and located in the side part of a vehicle, in order to measure an adiabatic pressure increase in the event of a side impact. The pressure sensor acts then as an indirect deformation sensor. Only one pressure sensor is shown here as an example, but it may be the case that at least two pressure sensors are located on opposite sides of the vehicle, or for example even four, in order to monitor all doors of a four-door vehicle, for example. The pressure sensor in this case may be required to be located in a largely enclosed part of the vehicle, so that there may be an adiabatic pressure increase.

Alternatively, such a pressure sensor may be placed in other parts of the vehicle, in order to detect a front impact, an offset impact, or a rear impact, for example. It may be important here for an adiabatic pressure increase to be possible in order to enable quick sensing through the pressure increase. Receiving module 7, processor 8, and memory 9 are located in the control unit, which may be arranged, for example, on the vehicle tunnel, but they may also be located in the pressure sensor itself. Adjacent to it there may also be other components, including a connection to an acceleration sensor as a plausibility sensor. The acceleration sensor itself may also be positioned in immediate proximity to processor 8. Instead of an acceleration sensor, other sensor types such as structure-borne sound detectors or deformation sensors may also act as plausibility sensors. Only if this plausibility sensor also signals an impact is processor 8 able to activate restraining arrangement 10. If the control unit is positioned centrally in the vehicle, then line 6 takes the form a two-wire line here. A unidirectional connection from the pressure sensor to the control unit is provided here in particular. In this case a direct current is put on line 6 by the control unit, in order to supply the pressure sensor with the necessary power. To transmit data, the pressure sensor impresses the measuring signal in the form of current fluctuations, i.e., by amplitude modulation, so that receiving module 7 receives the pressure signal through these current fluctuations. Pulse width modulation may also be provided instead of amplitude modulation.

Alternatively, a bidirectional connection may be provided on line 6, i.e. one where the control unit is able to transmit queries to the pressure sensor. Alternatively, a sensor bus may be provided. The pressure sensors and also the control unit may be connected to this sensor bus, as shown in FIG. 1. To that end, the connected sensors and the control unit have bus controllers, in order to make data traffic via the bus possible. Such a bus may be desired where there are a plurality of sensors, in order to reduce cable costs.

Normalization is carried out either by sensor element 1 itself or in signal preprocessor 4, which performs the division of the measured pressure by the ambient pressure, or by processor 8, which ultimately uses the measured value from the pressure sensor to perform the division only in the control unit. Hence, at least three options may be available. If normalization is achieved by sensor element 1 itself, then it may be possible, for example, to provide a hole in the pressure sensor diaphragm.

Figure 2:
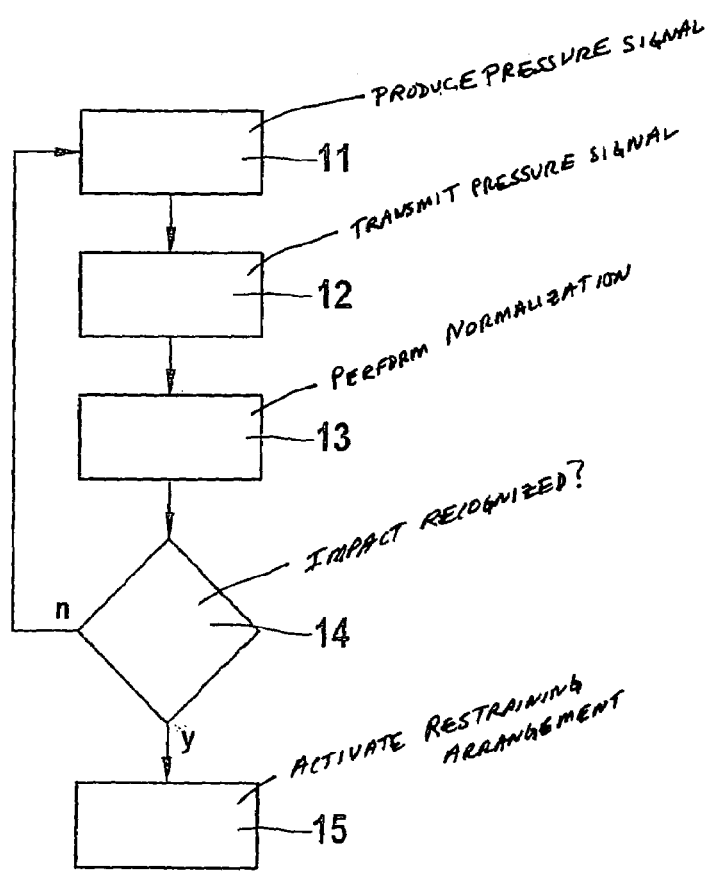
FIG. 2 shows a flow chart of the sequence of operations on the processor of the exemplary device according to the present invention.

FIG. 2 illustrates the sequence of an exemplary method which is given by the exemplary device. In method step 11 the pressure signal is produced by components 1 through 5 of the pressure sensor, as indicated above. Normalization of the pressure signal may be performed already here by sensor element 1 or by signal preprocessor 4. In method step 12, transmitter module 5 transmits the pressure signal or the normalized pressure signal to the control unit, namely receiving module 7. In method step 13, processor 8 receives the normalized or non-normalized pressure signal, and performs normalization if appropriate. In method step 14, processor 8 uses memory 9 to execute the triggering procedure, a plausibility signal, which may be taken, for example, from an acceleration sensor, being taken into account. Only if the pressure signal and the plausibility signal indicate an impact does processor 8 recognize an impact in the triggering procedure, and the system jumps to method step 15 to activate restraining arrangement 10. Parameters such as occupant monitoring and classification may also be taken into account when activating restraining arrangement 10. If no impact was detected in method step 14, then the system jumps back to method step 11

What is claimed is:

1. A device for impact sensing, comprising:
at least one pressure sensor to provide a signal; and
a processor connectable to the at least one pressure sensor so that the processor performs the impact sensing as a function of the signal,
wherein the signal is preprocessed so that the signal is normalized to a predefined pressure, the at least one pressure sensor is configured to measure an adiabatic pressure increase, and the device for impact sensing further includes:
a control unit; and
a unidirectional line arranged between the at least one pressure sensor and the control unit, wherein the control unit is configured to put a direct current on the unidirectional line in order to supply the at least one pressure sensor with power, and the at least one pressure sensor is configured to impress the signal as a current fluctuation.

2. The device of claim 1, wherein the signal is normalized to an ambient pressure.

3. The device of claim 1, further comprising:
an additional sensor to detect the ambient pressure.

4. The device of claim 3, wherein the at least one pressure sensor is arranged in a largely enclosed part, and the additional sensor is arranged outside of the largely enclosed part.

5. The device of claim 1, further comprising:
a memory to supply the ambient pressure.

6. The device of claim 1, wherein the at least one pressure sensor includes a sensor element configured to emit the normalized signal.

7. The device of claim 1, wherein the at least one pressure sensor is configured to normalize the signal.

8. The device of claim 1, wherein the processor is configured to normalize the signal.

* * * * *